(12) United States Patent
Linton

(10) Patent No.: US 10,689,161 B1
(45) Date of Patent: Jun. 23, 2020

(54) FASTENER WITH GUIDE POSTS AND METHODS THEREFOR

(71) Applicant: WL Reclosables LLC, Forest Park, GA (US)

(72) Inventor: Basil C. Linton, Loganville, GA (US)

(73) Assignee: WL RECLOSABLES LLC, Forest Park, GA (US)

( * ) Notice: Subject to any disclaimer, the term of this patent is extended or adjusted under 35 U.S.C. 154(b) by 1986 days.

(21) Appl. No.: 13/783,364

(22) Filed: Mar. 3, 2013

Related U.S. Application Data

(60) Provisional application No. 61/690,092, filed on Jun. 19, 2012.

(51) Int. Cl.
*B65D 33/25* (2006.01)
*B65B 47/00* (2006.01)
*B29C 48/00* (2019.01)

(52) U.S. Cl.
CPC .......... *B65D 33/2541* (2013.01); *B29C 48/00* (2019.02); *B65B 47/00* (2013.01)

(58) Field of Classification Search
CPC ..... B65D 33/2541; B65B 47/00; B29C 47/00; B29C 48/00; Y10T 24/45168
See application file for complete search history.

(56) References Cited

U.S. PATENT DOCUMENTS

| | | | |
|---|---|---|---|
| 4,528,224 A | 7/1985 | Ausnit | |
| 5,242,516 A * | 9/1993 | Custer | B29C 66/1122 156/244.11 |
| 5,592,802 A * | 1/1997 | Malin | B65B 9/20 53/133.4 |
| 5,638,586 A * | 6/1997 | Malin | B31B 19/90 24/584.1 |
| 5,660,479 A * | 8/1997 | May | B65D 33/2525 383/202 |
| 5,718,024 A * | 2/1998 | Robbins | B65D 33/2541 24/30.5 R |
| 5,747,126 A * | 5/1998 | Van Erden | B65D 33/255 24/585.12 |
| 6,004,032 A * | 12/1999 | Kapperman | B65D 33/2516 24/585.12 |
| 6,088,998 A * | 7/2000 | Malin | B31B 19/90 493/214 |
| 6,138,329 A | 10/2000 | Johnson | |
| 6,154,934 A * | 12/2000 | Matthews | B65D 33/2541 24/304 |
| 6,167,597 B1 * | 1/2001 | Malin | B31B 19/90 24/399 |
| 7,216,405 B2 * | 5/2007 | Gradl | A44B 19/16 24/585.12 |

(Continued)

*Primary Examiner* — Robert Sandy
*Assistant Examiner* — Louis A Mercado
(74) *Attorney, Agent, or Firm* — Philip H. Burrus, IV

(57) ABSTRACT

A zipper (100) includes a male closure element (101) and a female closure element (102). The male closure element includes a base member (103), one or more male interlocking members (201,203) extending distally from a first side of the base member, and a plurality of guide posts (105,107) extending from a second side of the base member. The female closure element includes a base member (104), one or more female interlocking members (202,204) extending distally from a first side of the base member, and a plurality of guide posts (106,108) extending from a second side of the base member.

16 Claims, 16 Drawing Sheets

(56) References Cited

U.S. PATENT DOCUMENTS 7,410,453 B2     8/2008  Fenzl et al.
7,674,040 B2 *   3/2010  Dowd ................ B65D 33/2508
                                                  383/61.2
7,731,646 B2 *   6/2010  Leighton ................ B31B 19/64
                                                  493/212

* cited by examiner

FASTENER WITH GUIDE POSTS AND METHODS THEREFOR

CROSS REFERENCE TO PRIOR APPLICATIONS

This application claims priority and benefit under 35 U.S.C. § 119(e) from U.S. Provisional Application No. 61/690,092, filed Jun. 19, 2012, which is incorporated by reference for all purposes.

BACKGROUND

Technical Field

This disclosure relates generally to fastening strips, and more particularly to fastening strips for flexible bags.

Background Art

Flexible packaging has played an increasing role in containing a wide variety of products ranging from liquid and dry chemicals to food products. A convenient way of sealing such flexible packaging includes the use of reclosable fastener assemblies known as a "zipper" strip, a zipper assembly, or more commonly, just a "zipper." Illustrating by example, reclosable bags are frequently manufactured by sealing a male member of a zipper assembly to one side of the bag and sealing a female member of a zipper assembly to the other side of the bag. The sealing process generally includes applying heat to the bag/zipper assembly to thermally seal the two components together. The male member and female member serve as interlocking fasteners elements to form a closure for the bag. Pressing the interlocking fasteners together seals the bag, while pulling the interlocking fasteners apart opens the bag. Zipper assemblies are convenient in that they can be opened and resealed multiple times.

With prior art fastener assemblies, manufacture can be difficult because it is challenging to obtain an adequate thermal seal between the flexible plastic web and the zipper strip due to the fact that the zipper strips are hard to align and can twist during the manufacturing process. Accordingly, prior art bags are prone to leaking due to one of the zipper strip elements not properly adhering to the plastic web of the bag. It would be advantageous to have an improved zipper strip that provides better sealing between the zipper strip and plastic web.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

Figure 1:
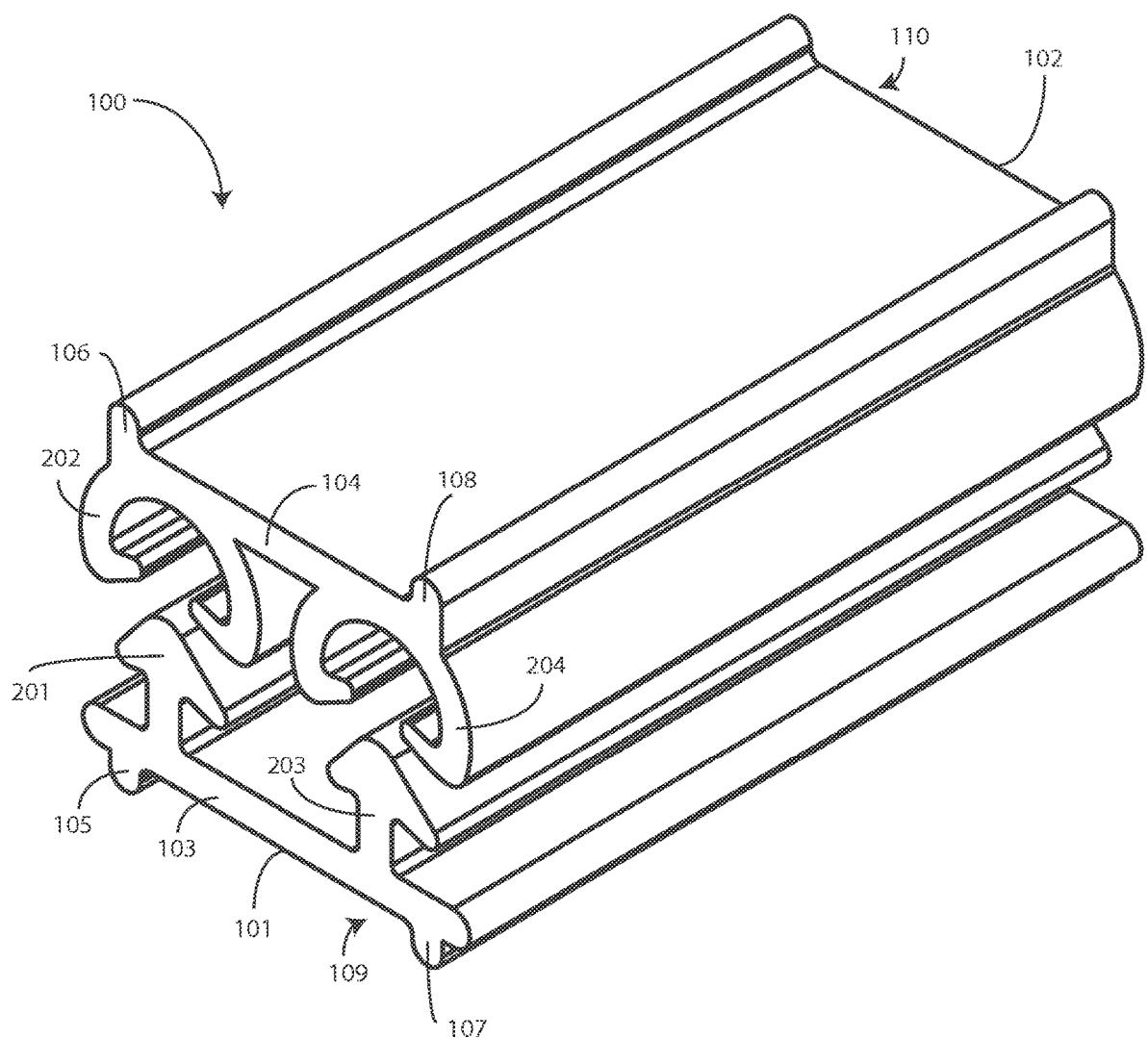
FIG. 1 illustrates an exploded perspective view of one explanatory zipper strip configured in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Reclosable bags are typically made by thermally sealing a zipper to a flexible plastic base film, known as a "web," with a heated sealing bar. The plastic web is frequently manufactured from polyethylene sheeting or multilayer sheeting that includes a polyethylene layer. Many prior art designs included pull flanges, which were portions of the web extending beyond the zipper that a user could grasp to pull the interlocking portions of the zipper apart. However, more recently, manufacturers have begun to use zippers without flanges. These flangeless zippers, which are sometimes referred to as "webless" zippers, are becoming increasingly popular due to the fact that they are lower in cost than are flanged designs. Additionally, the absence of the flange results in webless zippers requiring far less packaging space than do prior art flanged zippers.

As noted above, with prior art designs, sealing problems between the web and the zipper can arise. These sealing problems can be exacerbated when webless zippers are used because the amount of surface area to which the web can adhere is significantly reduced. While a flanged zipper provides a relatively large surface area at which a thermal sealing bar can seal the zipper to the web, webless zippers, by their nature, are very small. Consequently, prior art webless zippers require the use of mechanical stops disposed at either side of the zipper to keep the zipper upright and in line during the thermal sealing process. However, these mechanical stops are not always effective because webless zippers are manufactured in a variety of widths and the mechanical stops are not always adjustable. Moreover, the stops can move during the manufacturing process, thereby causing additional sealing problems, or can result in a closure system that requires a non-uniform opening force to open the closure, which is undesirable.

Embodiments of the present disclosure provide an improved zipper that includes a plurality of guide posts disposed on the exterior sides of the male interlocking member and the female interlocking member. In one embodiment, each closure element includes a base member that has interlocking members on a first side and the guide posts disposed on a second side of the base member. In one embodiment, the guide posts are disposed outside the interlocking members. The guide posts define a guide for a thermal sealing bar to provide an improved seal between a web and the base member of the closure element. Further, the guide posts prevent the zipper strip from moving during the manufacturing process to provide an end closure in which the opening force required is far more uniform than with prior art designs.

Another advantage offered by embodiments of the disclosure relates to winding. In one or more embodiments, the zipper is extruded and then wound onto a spool. The guide posts described below work as feet to seat the zipper against the center of the spool with the first winding, and then against other layers of the zipper in subsequent winding. Prior art zippers tend to twist and turn during winding, and thus result in slow manufacturing times. Winding embodiments of the disclosure is much quicker and eliminates the twisting that occurs with prior art designs.

In one embodiment, a male closure element includes a base member and one or more male interlocking members extending distally from a first side of the base member. A pair of guide posts extends distally from a second side of the base member. Each guide post defines a center line that passes, in one embodiment, substantially orthogonally through the base member. In one embodiment, all the interlocking members are disposed between the center lines of the guide posts when the male closure element is viewed in cross section. This results in the guide posts being disposed "outside" the interlocking members. Advantageously, this "outside" location results in better sealing characteristics to a web, as well as faster and more reliable winding on a spool.

In one embodiment, a female closure element also includes a base member. One or more female interlocking members extend distally from a first side of the base member. In one embodiment, the female interlocking members are substantially U-shaped, and define a female interlocking member centerline at the base of the U-shape. As with the male closure element, the female closure element includes a plurality of guide posts disposed on a second side of the base member, and extend distally away from the base member in a direction opposite that of the guide posts. In one embodiment the center lines of the female interlocking members are disposed between the guide posts to provide advantageous sealing characteristics and better winding characteristics as well.

Figure 2:
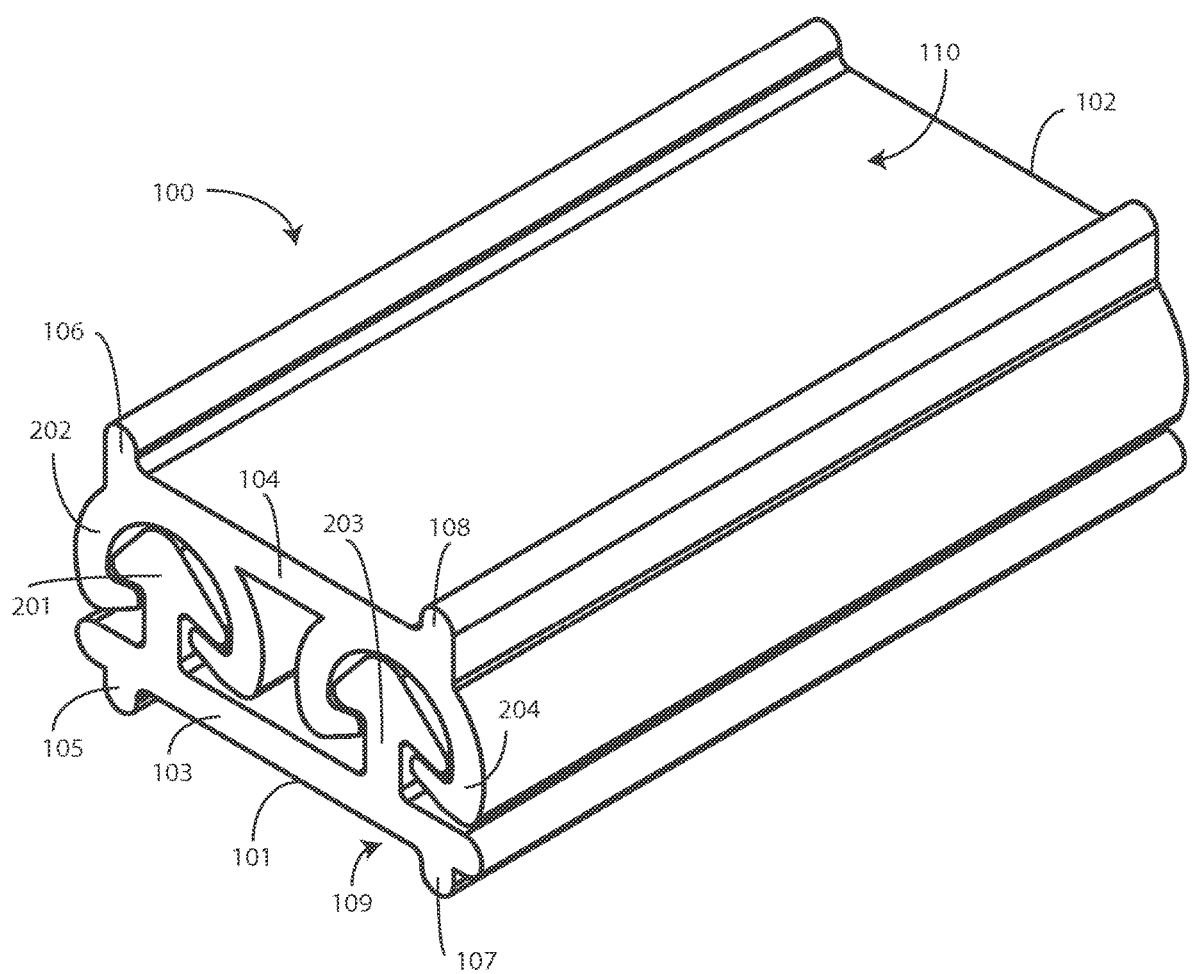
FIG. 2 illustrates a perspective view of one explanatory zipper strip with the male and female interlocking members removably locked together in accordance with one or more embodiments of the disclosure.

Turning now to FIGS. 1 and 2, illustrated therein is a perspective view of one zipper 100 configured in accordance with one or more embodiments of the disclosure. The explanatory zipper 100 includes a male closure element 101 and a female closure element 102. In FIG. 1, the male closure element 101 and the female closure element 102 have been separated. In FIG. 2, the male closure element 101 and the female closure element 102 have been attached together by pressing the male interlocking members 201,203 into the female interlocking members 202,204.

Each of the male closure element 101 and the female closure element 102 includes a base member 103,104, which is configured in this explanatory embodiment as a substantially planar surface. The male interlocking members 201, 203 and the female interlocking members 202,204 each extend from a first side of their respective base members 103,104, respectively.

In this explanatory embodiment, each of the male closure element 101 and the female closure element 102 also includes a plurality of guide posts 105,107,106,108. The guide posts 105,107,106,108 extend distally from their respective base members 103,104 from a second side that is opposite the first side from which the male interlocking members 201,203 and the female interlocking members 202,204. In so doing, the guide posts 105,107,106,108 form channels 109,110 into which a thermal sealing bar may pass when sealing a web to the second sides of each base member 103,104 during manufacture. Additionally, the guide posts 105,107,106,108 serve as mechanical stabilization elements when the zipper 100 is wound on a spool. They prevent the zipper 100 from twisting as it is being spooled.

Figure 3:
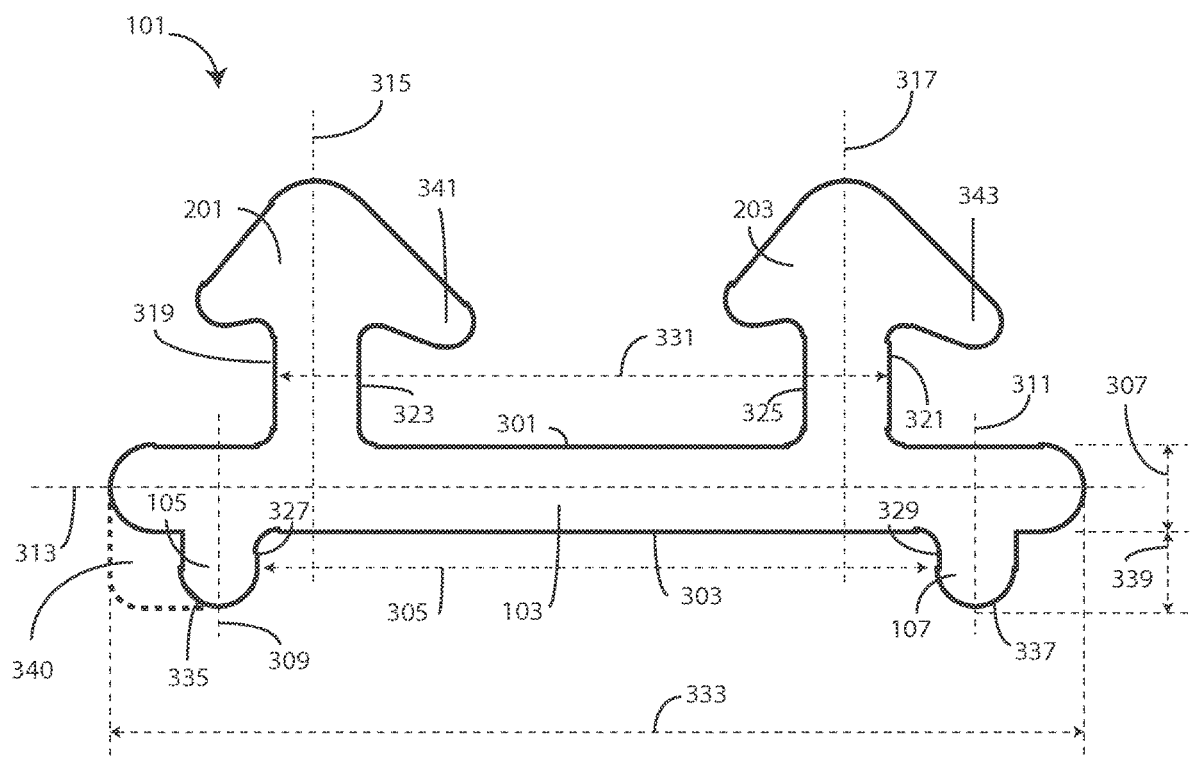
FIG. 3 illustrates a sectional view of one explanatory male interlocking member configured in accordance with one or more embodiments of the disclosure.

Turning now to FIG. 3, illustrated therein is a sectional view of one explanatory male closure element 101 configured in accordance with one or more embodiments of the disclosure. In one embodiment, the male closure element 101 is manufactured from a low-density polyethylene blend containing a percentage of ethylene vinyl acetate via an extrusion process. The ethylene vinyl acetate, or "EVA" allows increased flexibility as well as reducing the sealing temperature required to seal the male closure element 101 to a web.

As described above, in one embodiment the male closure element 101 includes a base member 103 configured as a substantially planar element. One or more male interlocking members 203 extend distally from a first side 301 of the base member 103. A plurality of guide posts, shown illustratively here as two guide posts 105,107, extend distally from a second side 303 of the base member 103. Note that the guide posts 105,107 can extend from an interior portion of the base member 103, as each guide post 105,107 does in this embodiment. However, in other embodiments, the guide posts can extend all the way to the edge of the base member 103. Illustrating by example, in one embodiment base member 105 could include extra portion 340 which would cause it to extend to the end of the base member 103 as shown by the dotted lines in FIG. 3.

In one embodiment, the base member 103 has a width 333 that is between 0.120 and 0.125 inches. In one embodiment, the width 333 is about 0.123 inches. As used herein, the term "about" is used to refer to a dimension inclusive of manufacturing tolerances. For example, if the manufacturing tolerances were plus or minus two micrometers, a dimension of "about" 0.100 inches would include a range of 0.098 inches to 0.102 inches, inclusive. The dimensions of the width 333 are illustrative only, as other dimensions will be obvious to those of ordinary skill in the art having the benefit of this disclosure.

The base member 103 also includes a thickness 307. In one embodiment, the thickness 307 is between 0.010 inches and 0.025 inches. In one embodiment, the thickness 307 is about 0.015 inches. In one embodiment, this thickness 307 is substantially consistent across the length 333 of the base member 103.

As shown in the sectional view of FIG. 3, each guide post 105,107 defines a corresponding center line 309,311. For example, the first guide post 105 defines a first center line 309. Similarly, the second guide post 107 defines a second center line 311. In one embodiment, both the first center line 309 and the second center line 311 are oriented substantially orthogonally with a reference line 313 defined by the width 333 of the base member 301. As with the term "about," the term "substantially is used to refer to an orientation inclusive of manufacturing tolerances. Accordingly, if the tolerance were plus or minus one degree, both 89.1 degrees and 90.62 degrees would be "substantially" orthogonal with the width 333.

As with the guide posts 105,107, each of the male interlocking members 201,203 also defines a center line 315,317. Each male interlocking member 201,203 also has an outer surface 319,321 and an inner edge 323,325, respectively. Experimental testing has shown that when all the male interlocking members 201,203 are disposed "between" the guide posts 105,107 two advantages result: First, the male closure element 101 seals more effectively to a web. Second, winding on a spool is enhanced. Accordingly, in one or more embodiments, the center lines 315,317 of the male interlocking members 201,203 are disposed between the center lines 309,311 of the guide posts 105,107. In one embodiment, all of the center lines 315,317 corresponding to male interlocking members 201,203 disposed on the base member 103 are disposed between the center lines 309,311 of the guide posts 105,107.

In one embodiment, not only are the center lines 315,317 of the male interlocking members 201,203 disposed between the center lines 309,311 of the guide posts 105,107, but so too are the outer surfaces 319,321 of the male interlocking members 201,203. In the explanatory embodiment of FIG. 3, the outer surfaces 319,321 of the male interlocking members 201,203 are also disposed between the inner surfaces 327,329 of the guide posts 105,107 as well. Accordingly, in this explanatory embodiment, the male interlocking members 201,203 are completely disposed between the guide posts 105,107 such that a distance 331 from a first post outer surface 319 to a second post outer surface 321 is less than the distance 305 between a first guide post inner surface 327 and a second guide post inner surface 329. In one embodiment, distance 331 is about 0.086 inches, while distance 305 is about 0.056 inches.

In this illustrative embodiment, each guide post 105,107 terminates in a convex surface 335,337 relative to the width 333 of the base member 103. While this is one explanatory termination, others will be obvious to those of ordinary skill in the art having the benefit of this disclosure. For example, a square termination or a concave termination can also be used as well. In one embodiment, each guide post 105,107 has a height 339 of between 0.001 inches and 0.003 inches. In one embodiment, the height 339 is about 0.002 inches.

In one embodiment, each male interlocking member terminates in asymmetrical barbs. In other embodiments, the male interlocking members can terminate in symmetrical barbs. In the explanatory embodiment of FIG. 3, the first male interlocking member 201 comprises an asymmetrical barb 341 at its distal end. Similarly, the second male interlocking member 203 comprises another asymmetrical barb 343 at its distal end. In one embodiment, the asymmetrical barbs 341,343 are integrally formed on the distal ends of each male interlocking member. As will be described below, in one embodiment the asymmetrical barbs 341,343 are configured to insert into a complementary female closure element, or alternatively to engage complementary male closure elements.

In the explanatory view of FIG. 3, the asymmetrical barbs 341,343 are longer on the right side of each male interlocking member 201,203 than they are on the left side. When the asymmetrical barbs are interlocked with a complementary female closure element, as will be described below, the extra length on the right side requires additional force to open a bag employing the male closure element 101 from the right side than from the left. This is by design and is intended to keep product within the bag (the bag being on the right side in the view of FIG. 3) by making it more difficult to open the bag from that side. Accordingly, the right side is known as the "product side" and the longer barb of the asymmetrical barbs 341,343 is known as the product side barb. Conversely, the left side is known as the "consumer side" and the shorter barb of the asymmetrical barbs 341,343 is known as the consumer side barb. A desired amount of force required to open the zipper (100) from either side can be easily designed into the male closure element 101 by increasing or decreasing the size of barbs.

Figure 4:
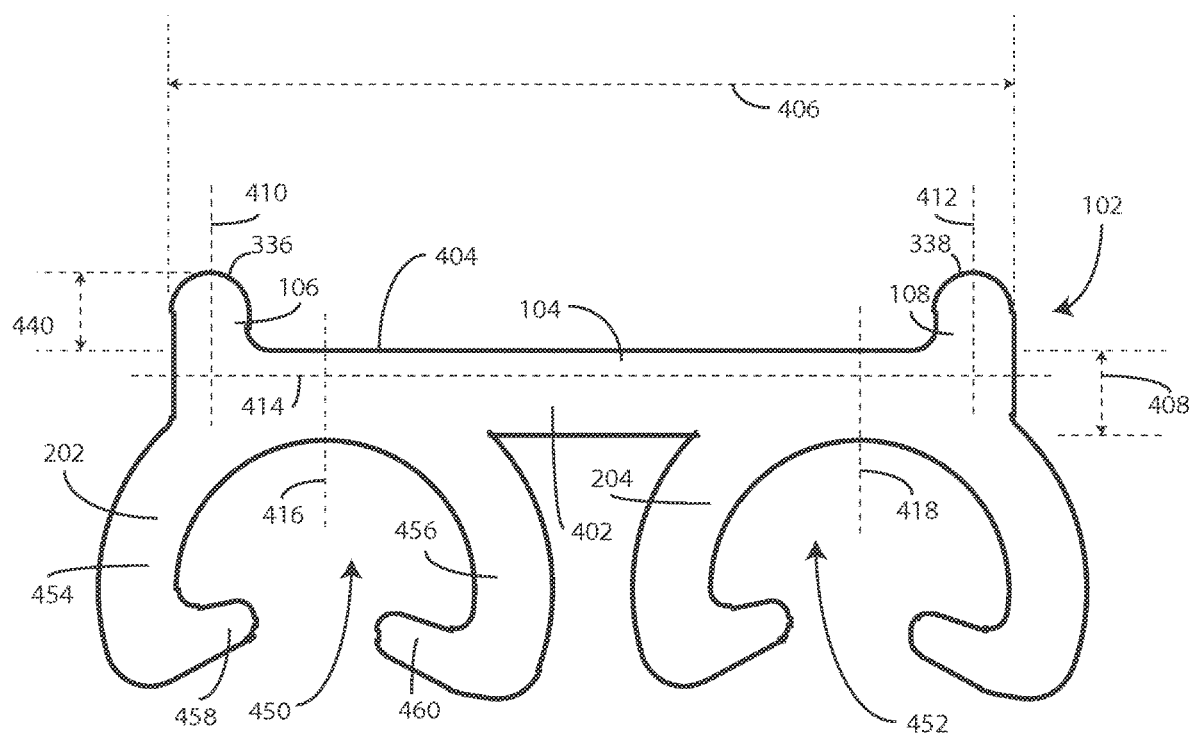
FIG. 4 illustrates a sectional view of one explanatory female interlocking member configured in accordance with one or more embodiments of the disclosure.

Turning now to FIG. 4, illustrated therein is a sectional view of one embodiment of a female closure element 102 configured in accordance with one or more embodiments of the disclosure. In one embodiment, the female closure element 102 is manufactured from a low-density polyethylene blend containing a percentage of ethylene vinyl acetate via an extrusion process. The ethylene vinyl acetate, or "EVA" allows increased flexibility as well as reducing the sealing temperature required to seal the female closure element 102 to a web.

Figure 19:
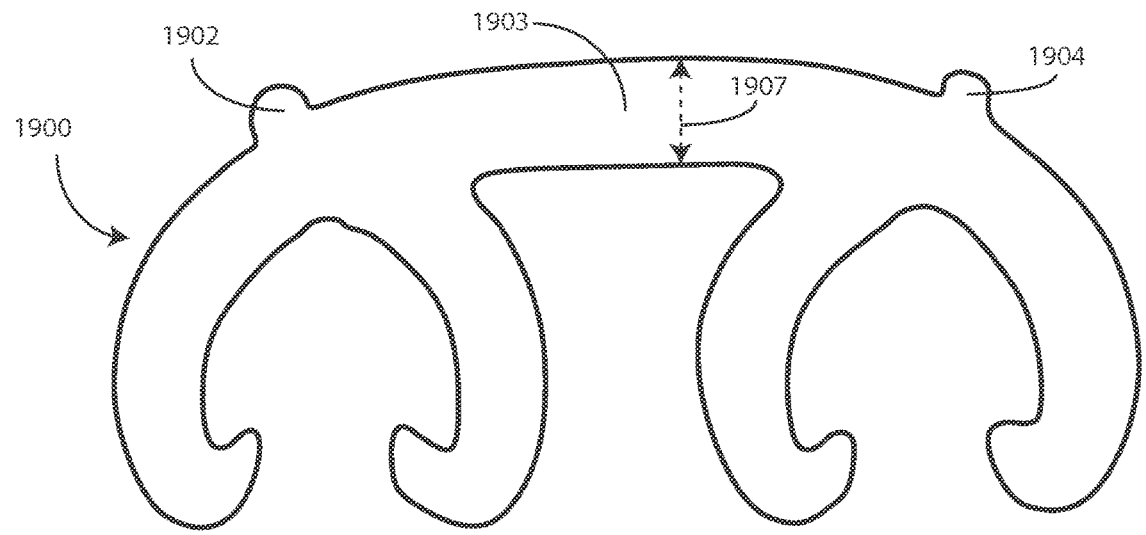
FIG. 19 illustrates a sectional view of one explanatory female closure element in accordance with one or more embodiments of the disclosure.

In one embodiment the female closure element 102 includes a base member 104 configured as a substantially planar element. In another embodiment, the female closure element 102 includes a base member 104 configured to be concave relative to one or more female interlocking members 202,204 extend distally from a first side 402 of the base member 104. Turning briefly to FIG. 19, such an embodiment 1900 is shown in FIG. 19. In this embodiment 1900, the base member 1903 has substantially the same thickness 1907 as it extends from one female closure element 1902 to another female closure element 1904. Turning now back to FIG. 2, a plurality of guide posts, shown illustratively here as two guide posts 106,108, extend distally from a second side 404 of the base member 104.

In one embodiment, the base member 104 has a width 406 that is between 0.090 and 0.120 inches. In one embodiment, the width 406 is about 0.110 micrometers. The base member 104 also includes a thickness 408. In one embodiment, the thickness 408 is between 0.008 inches and 0.015 inches. In one embodiment, the thickness 409 is about 0.012 inches micrometers.

As shown in the sectional view of FIG. 4, each guide post 106,108 defines a corresponding center line 410,412. For example, the first guide post 106 defines a first center line 410. Similarly, the second guide post 108 defines a second center line 412. In one embodiment, both the first center line 410 and the second center line 412 are oriented substantially orthogonally with a reference line 414 defined by the width 406 of the base member 104.

In the explanatory embodiment of FIG. 4, each female interlocking member 202,204 is substantially U-shaped. Note that the U-shape can be a rounded U-shape as shown in FIG. 4, or alternatively can be a squared U-shape where the curved surfaces of each female interlocking member 202,204 are squared to form orthogonal angles between the base member and each side member of the female interlocking members 202,204.

In one embodiment, each female interlocking member 202,204 defines a first channel 450 and a second channel 452, respectively, configured to receive, in one embodiment, the male interlocking members (201,203) of FIG. 3. For example, female interlocking member 202 includes a first leg 454 and a second leg 456. Female interlocking member 204 is similarly configured in this embodiment. The first leg 454 and second leg 456 can optionally terminate in catch barbs 458,460 in one or more embodiments. The catch barbs 458,460 can extend inwardly from the first leg 454 and second leg 456 respectively.

As with the guide posts 106,108, each of the female interlocking members 202,204 also defines a center line 416,418 at the base of its corresponding U-shape. Experimental testing has shown that when all the female interlocking members 202,204 are disposed "between" the guide posts 106,108 two advantages result: First, the female closure element 102 seals more effectively to a web. Second, winding on a spool is enhanced. Accordingly, in one or more embodiments, the center lines 416,418 of the female interlocking members 202,204 are disposed between the center lines 410,412 of the guide posts 106,108. In one embodiment, all of the center lines 416,418 corresponding to female interlocking members 202,204 are disposed on the base member 104 between the center lines 410,412 of the guide posts 106,108.

As with the male closure element (101) of FIG. 3, in this illustrative embodiment, each guide post 106,108 terminates in a convex surface 436,438 relative to the width 406 of the base member 104. While this is one explanatory termination, others will be obvious to those of ordinary skill in the art having the benefit of this disclosure. For example, a square termination or a concave termination can also be used as well. In one embodiment, each guide post 106,108 has a height 440 of between 0.001 and 0.0013 inches. In one embodiment, the height 440 is about 0.002 inches.

Figure 5:
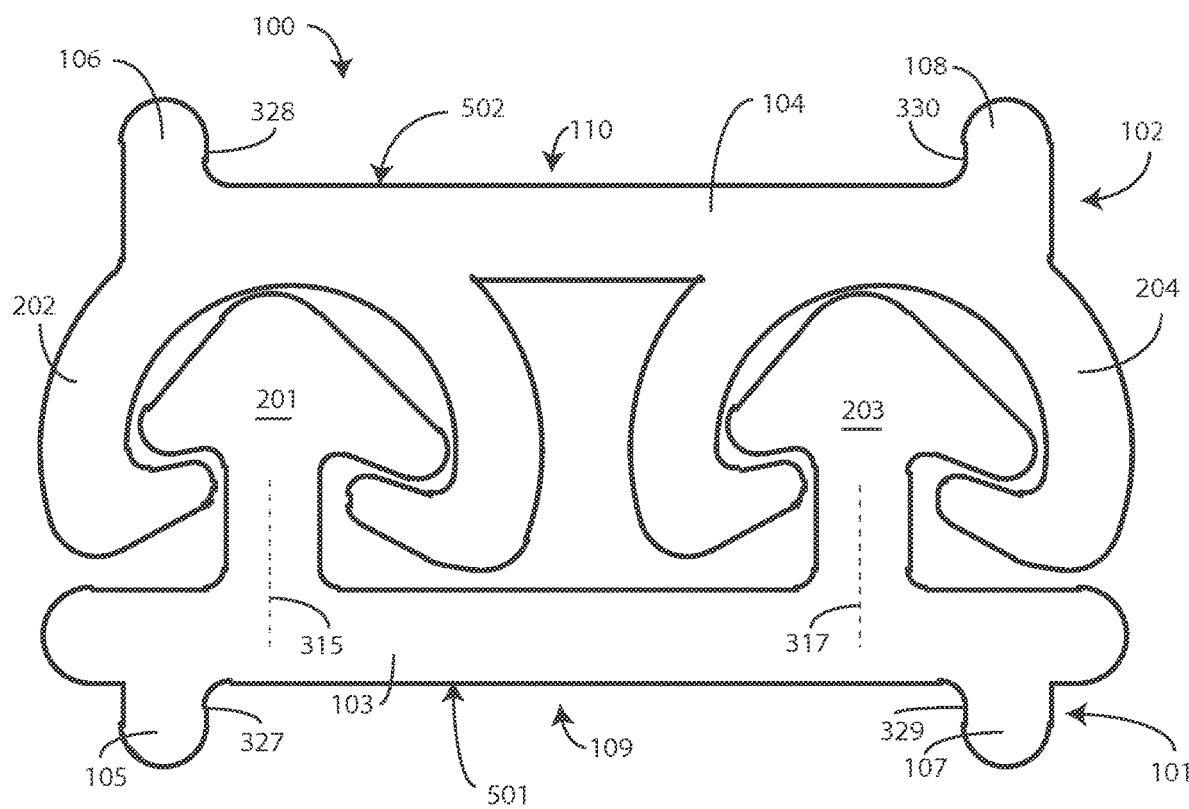
FIG. 5 illustrates an explanatory zipper strip configured in accordance with one or more embodiments of the disclosure.

Turning now to FIG. 5, illustrated therein is a sectional view of the zipper 100 of FIG. 1. The zipper 100 has been formed by inserting the male interlocking members 201,203 into the female interlocking members 202,204. Note in this figure that the guide posts 105,107 of the male closure element 101 define boundaries of a sealing region 501 that can be thermally adhered to a plastic web. In this embodiment, the sealing region 501 is defined by the planar portion of the second side 103 of the male closure element 101 that spans between the inner surfaces 327,329 of the guide posts 105,107. The guide channel 109 for the heat sealing bar is also defined by the inner surfaces 327,329 of the guide posts 105,107. In this illustrative embodiment, the center lines 315,317 of the male interlocking members 201,203 pass substantially through this sealing region 501.

Similarly, the guide posts 106,108 of the female closure element 102 define boundaries of another sealing region 502 that can be thermally adhered to a plastic web. In this embodiment, the sealing region 502 is defined by the planar portion of the second side 104 of the female closure element 102 that spans between the inner surfaces 328,330 of the guide posts 106,108. The guide channel 110 for another heat sealing bar is also defined by the inner surfaces 328,330 of the guide posts 106,108.

Figure 6:
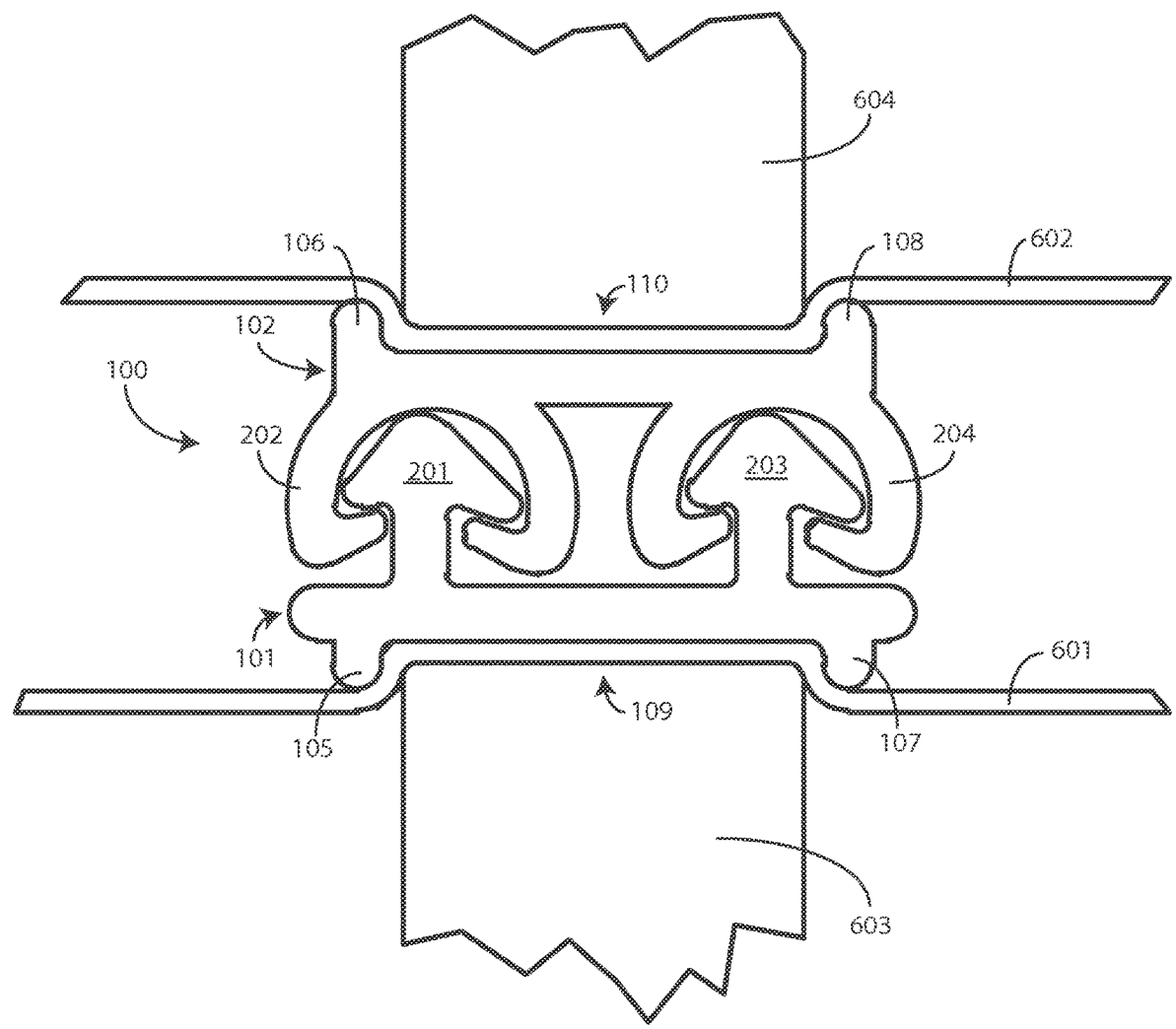
FIG. 6 illustrates a sectional view of one explanatory zipper strip being thermally sealed to a plastic web in accordance with one or more embodiments of the disclosure.

Turning now to FIG. 6, illustrated therein is the zipper 100 being sealed to a plastic web 601,602. Two heat sealing bars 603,604 pass through the guide channels 109,110 defined by the guide posts 105,107,106,108 of the male closure element 101 and female closure element 102, respectively, to seal the plastic web 601,602 to the zipper 100. In one embodiment, a Teflon belt (not shown) can be placed between the web 601,602, and the zipper 100 to prevent the web 601,602 from melting. The heat sealing bars 603,604 can be configured to apply mild pressure against the Teflon belts and to transfer heat through the belts to the web 601,602. While this pressure is being applied, the mechanical structure of the zipper 100 is provided by the male interlocking members 201,203 pressing against the bottom of the U-shapes of the female interlocking members 202,204.

Figure 7:
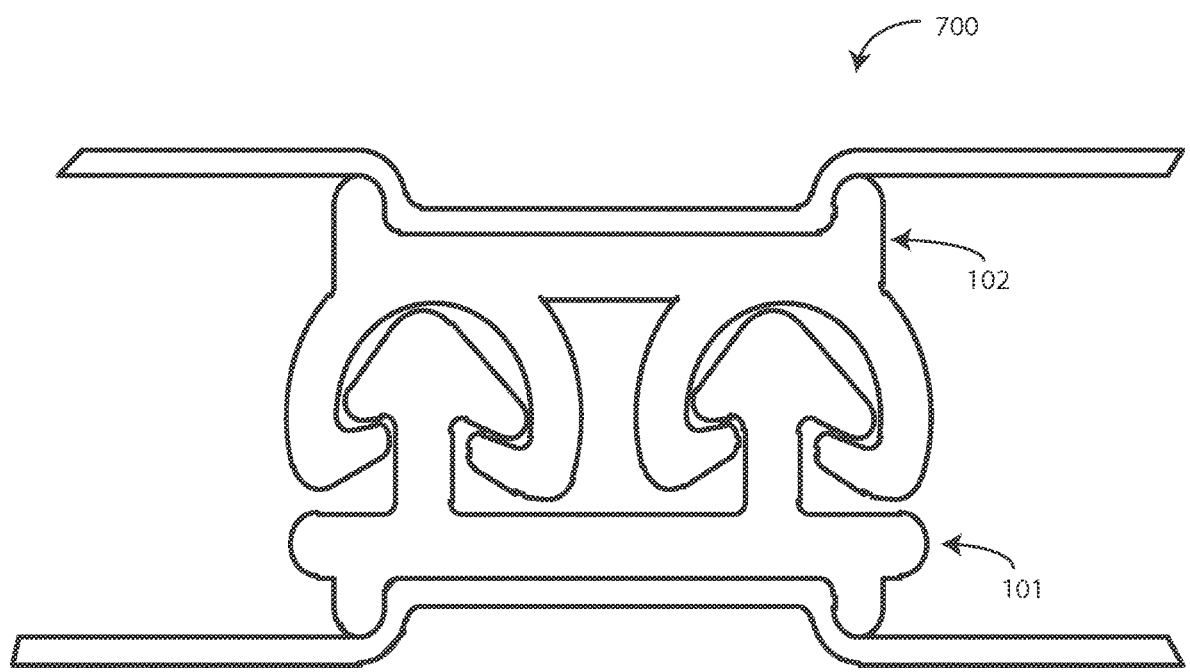
FIG. 7 illustrates a sectional view of one explanatory zipper strip thermally sealed to a plastic web in accordance with one or more embodiments of the disclosure.
Figure 8:
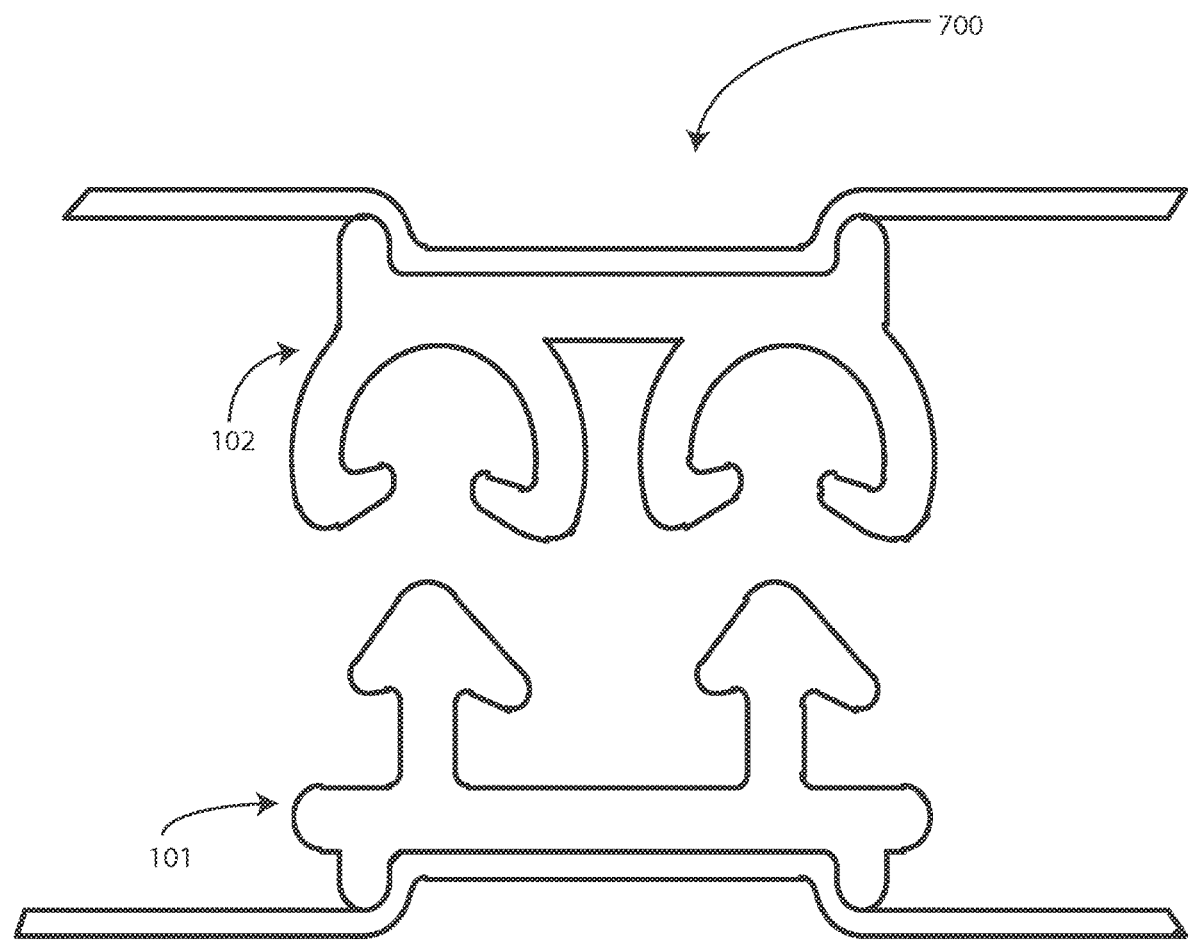
FIG. 8 illustrates a sectional view of one explanatory zipper strip assembly, with male and female interlocking members separated, the zipper strip assembly being configured in accordance with one or more embodiments of the disclosure.

FIG. 6 also illustrates a method for attaching a fastener, e.g., zipper 100, to a web 601,602. The process of FIG. 6 begins when the zipper is placed against the plastic web 601,602. The heat sealing bars 603,604 are then passed between their respective guide posts 105,107,106,108 to thermally seal the male closure element 101 and the female closure element 102 to the plastic web 601,602. In the embodiment of FIG. 6, the male closure element 101 has been attached to the female closure element 102 by attaching the complementary interlocking members, male interlocking members 201,203 and female interlocking members 202, 204, to each other prior to placing the webs against the second sides of each closure element. This allows the heat sealing bars 603,604 to pass through the channels 109,110 defined by the guide posts 105,107,106,108 simultaneously. The resulting assembly 700 is shown with male closure element 101 and female closure element 102 attached together in FIG. 7. The assembly 700 is shown in FIG. 8 with the male closure element 101 and female closure element 102 separated in FIG. 8.

Figure 9:
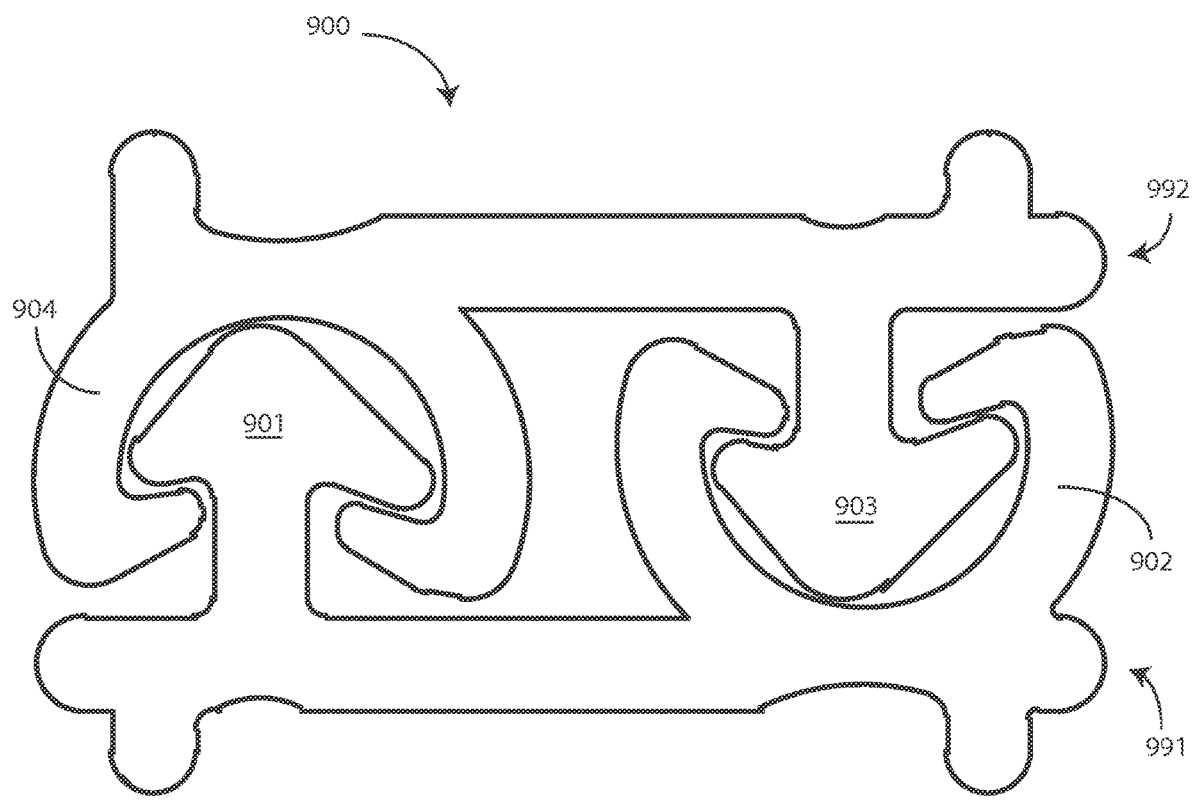
FIG. 9 illustrates an alternate zipper strip configured in accordance with one or more embodiments of the disclosure.

Turning now to FIG. 9, illustrated therein is an alternate zipper 900 configured in accordance with one or more embodiments of the invention. To this point, the male closure element (101) has included multiple male interlocking members (201,203) extending from its base member (103). Similarly, the female closure element (102) has included multiple female interlocking members (202,204) extending from its base member (104).

In the explanatory embodiment of FIG. 9, a first closure element 991 includes a male interlocking element 901 and a female interlocking element 902. Similarly, the second closure element 992 includes a complementary male interlocking element 903 and a complementary female interlocking element 904. This complementary design facilitates a more uniform material flow for each closure element 991,992 during the extrusion process. Experimental testing has shown that a nearly equal flow of material will occur to each lateral half of each closure element 991,992 during the extrusion process when using the design of FIG. 9.

Figure 10:
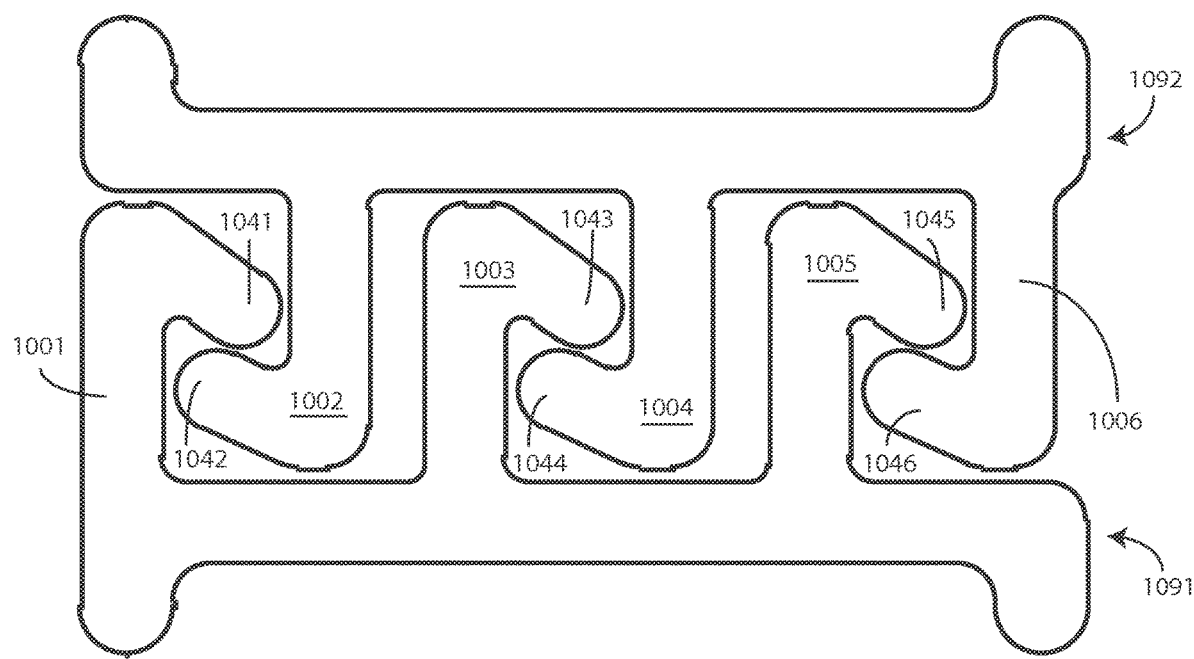
FIG. 10 illustrates an alternate zipper strip configured in accordance with one or more embodiments of the disclosure.

Turning now to FIG. 10, illustrated therein is yet another zipper 1000 configured in accordance with embodiments of the invention. In the explanatory embodiment of FIG. 10, a first closure element 1091 includes three male interlocking elements 1001,1003,1005. Each male interlocking element 1001,1003,1005 terminates in a single-sided barb 1041, 1043,1045. While previous embodiments included a corresponding female interlocking element, in the embodiment of FIG. 10, the second closure element 1092 is effectively a 180-degree rotation of the first closure element 1091. The second closure element 1092 also includes three male interlocking elements 1002,1004,1006. Each male interlocking element 1002,1004,1006 terminates in a single-sided barb 1042,1044,1046 as well.

Figure 11:
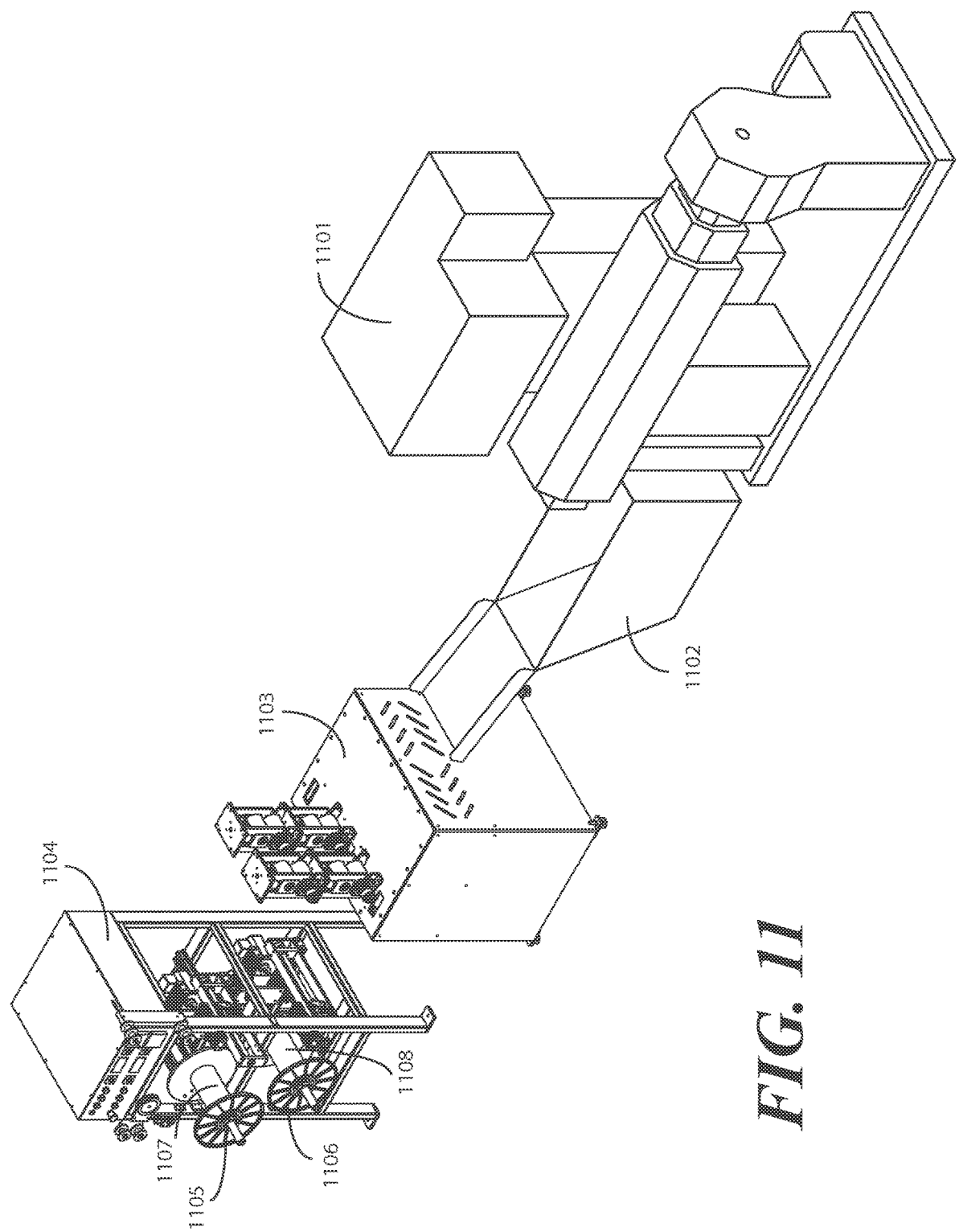
FIGS. 11-13 illustrate one explanatory method of manufacturing one or more zipper strips configured in accordance with one or more embodiments of the disclosure.
Figure 12:
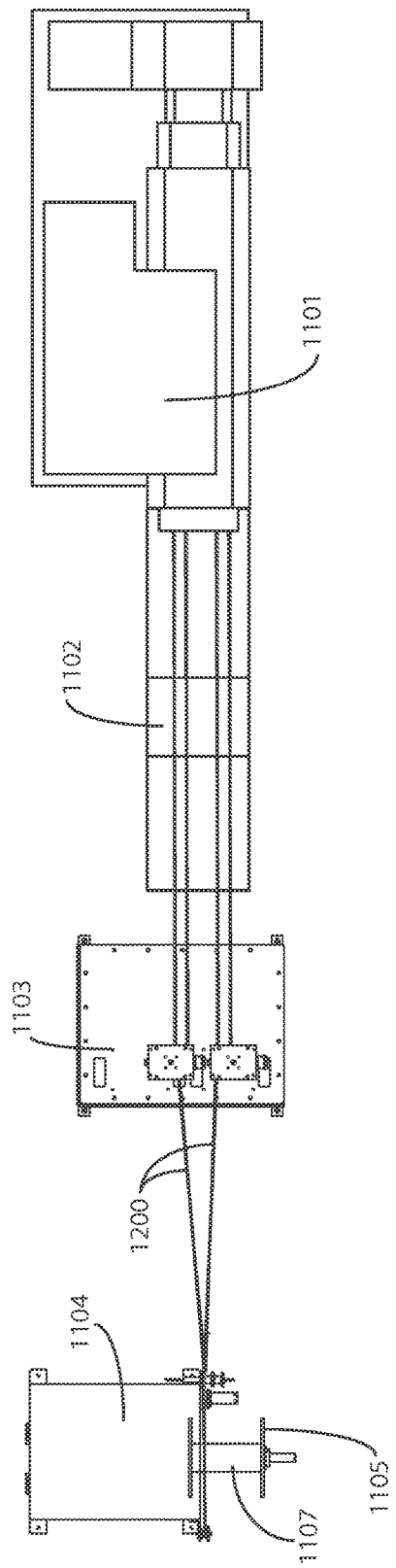
Figure 13:
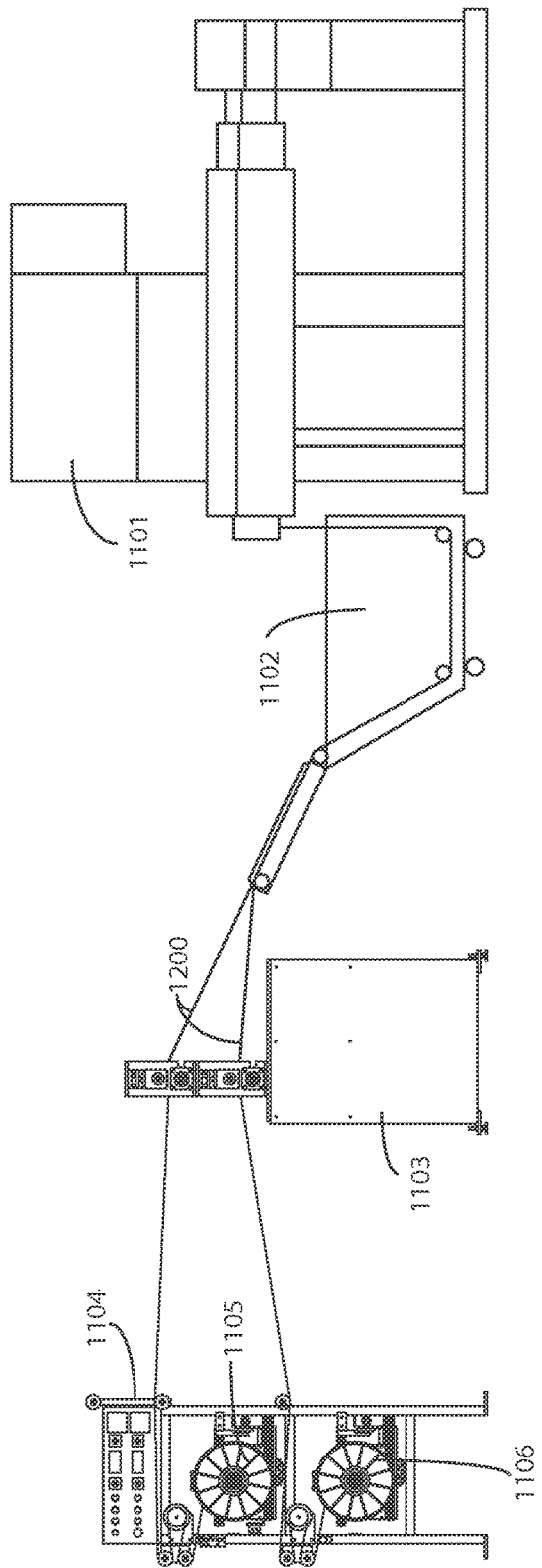

Turning now to FIGS. 11-13, illustrated therein is a method for manufacturing zippers configured in accordance with one or more embodiments of the invention. FIG. 11 illustrates a perspective view of a zipper manufacturing operation, while FIGS. 12 and 13 illustrate a top plan view and a side elevation view of the operation, respectively.

Four different stations are shown in FIGS. 11-13. These include an extruder 1101, a water bath 1102, a puller 1103, and a winder 1104. The zipper 1200 is first extruded from the extruder 1101 and fed into a water bath 1102. The puller 1103 then draws the zipper 1200 from the water bath 1102 so that it may be delivered to the winder. When the zipper 1200 is wound on a spool 1105,1106, in one embodiment the guide posts of one of the closure elements forming the zipper 1200, i.e., the closure element closest to the center 1107, 1108 of the spool 1105,1106 is oriented relative the spool 1105,1106 such that the guide posts are disposed toward the center 1107,1108 of the spool 1105,1106 and the interlocking members extend distally away from the center 1107, 1108 of the spool 1105,1106. The complementary closure element will, of course, be oriented just the opposite with its interlocking members extending toward the center 1107, 1108 of the spool 1105,1106. As noted above, the guide posts advantageously serve as feet to balance the zipper 1200 against the spool during the first winding, and against layers of zipper 1200 in subsequent windings. This balancing prevents any twisting of the zipper, thereby allowing the winding process to occur faster. Experimental testing has shown that the inclusion of guide posts on the closure elements forming the zipper 1200 can decrease the winding time by as much as twenty percent.

Figure 14:
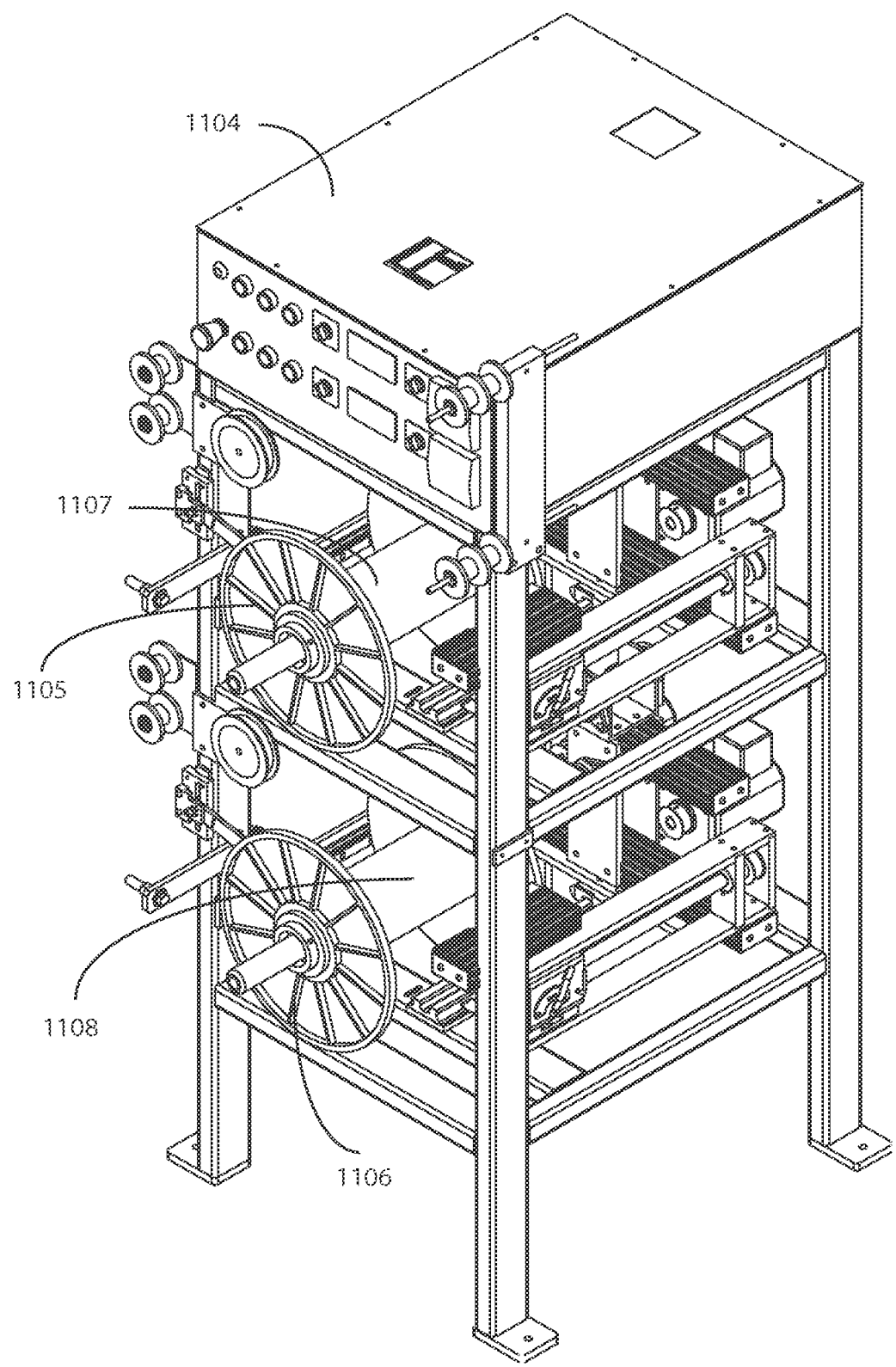
FIGS. 14-15 illustrate one explanatory winding machine configured to spool one or more zipper strips configured in accordance with one or more embodiments of the disclosure.
Figure 15:
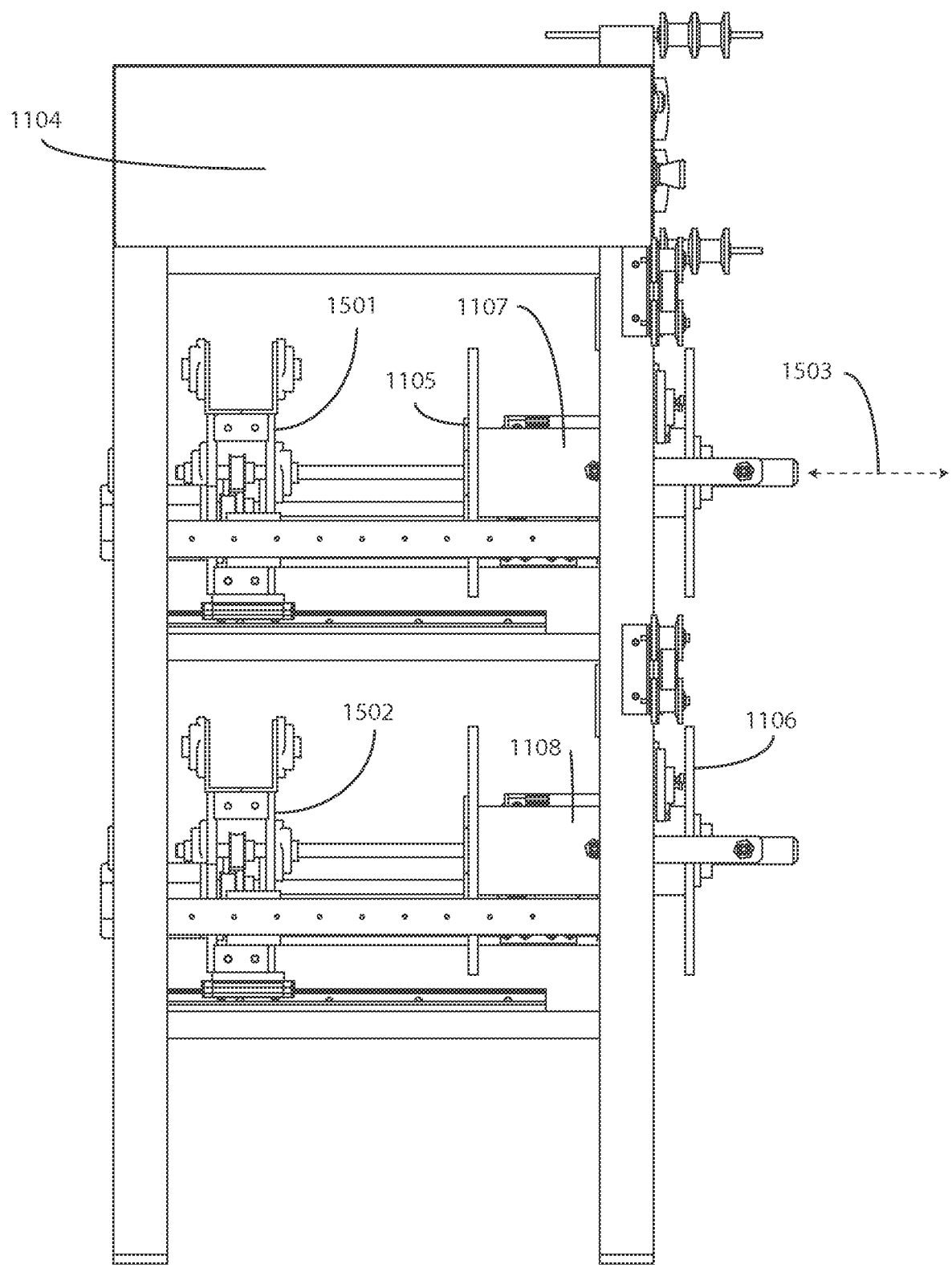

In addition to employing the guide posts, in one or more embodiments, the winding time can be further improved by oscillating each spool 1105,1106 laterally during the winding process. Turning briefly to FIGS. 14-15, illustrated therein is the winder 1104 in more detail. The winder 1104 includes an oscillation motor 1501,1502 that is configured to move each spool 1105,1106 laterally 1503 during the winding process. Accordingly, rather than passing the zipper (1200) back and forth across the center 1107,1108 of each spool 1105,1106, the zipper (1200) can be kept fixed while the spool 1105, 1106 moves.

Turning now back to FIGS. 11-13, this can be more readily seen. Spool 1105 has been oscillated laterally outward from the winder 1104, while spool 1106 has been oscillated laterally inward. The position of the zipper 1200 shown in FIG. 12 can then remain constant during the winding process, thereby further reducing any tendency for the zipper 1200 to twist as it moves from the puller 1103 to the winder 1104.

Figure 16:
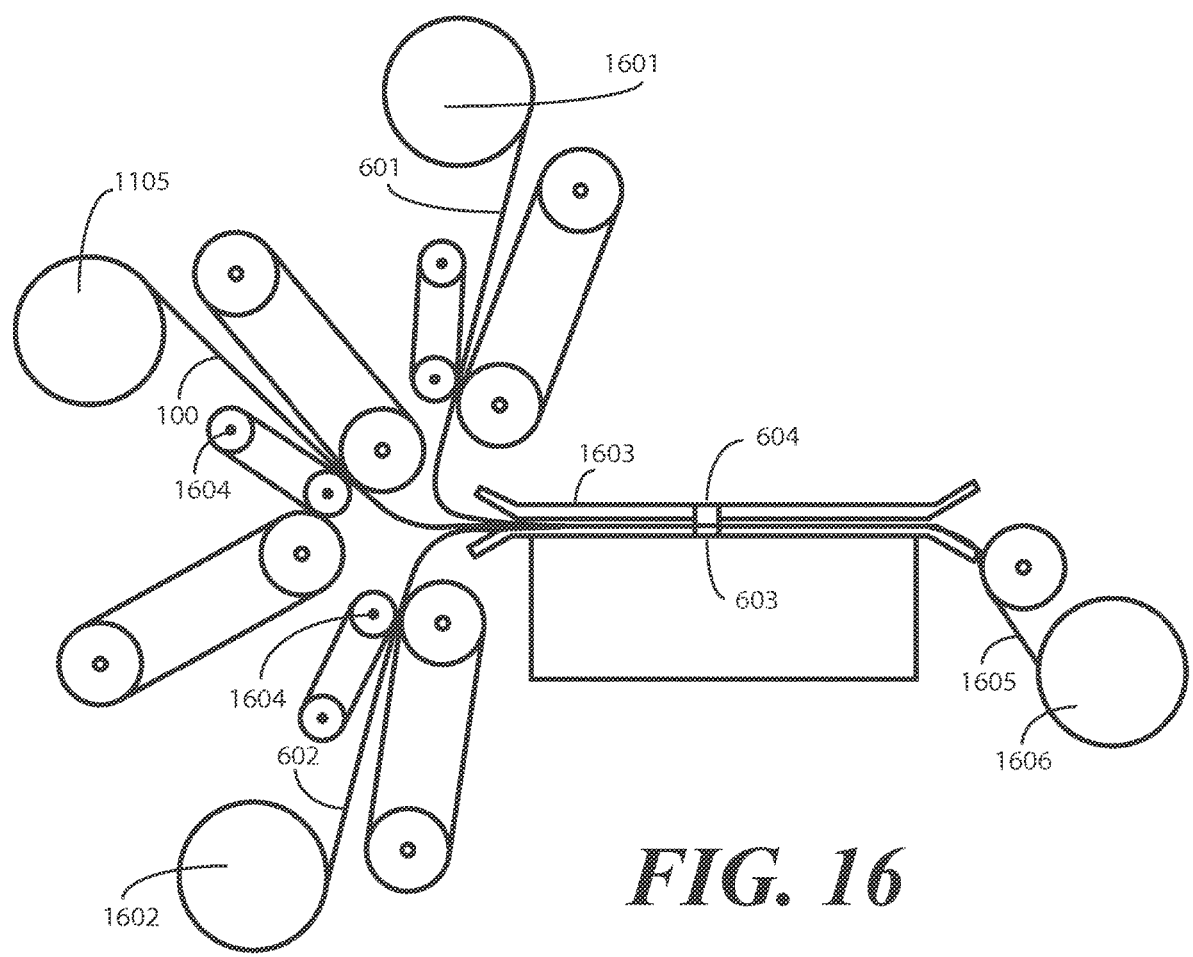
FIG. 16 illustrates one explanatory method of attaching a zipper strip to a plastic web in accordance with one or more embodiments of the disclosure.
Figure 17:
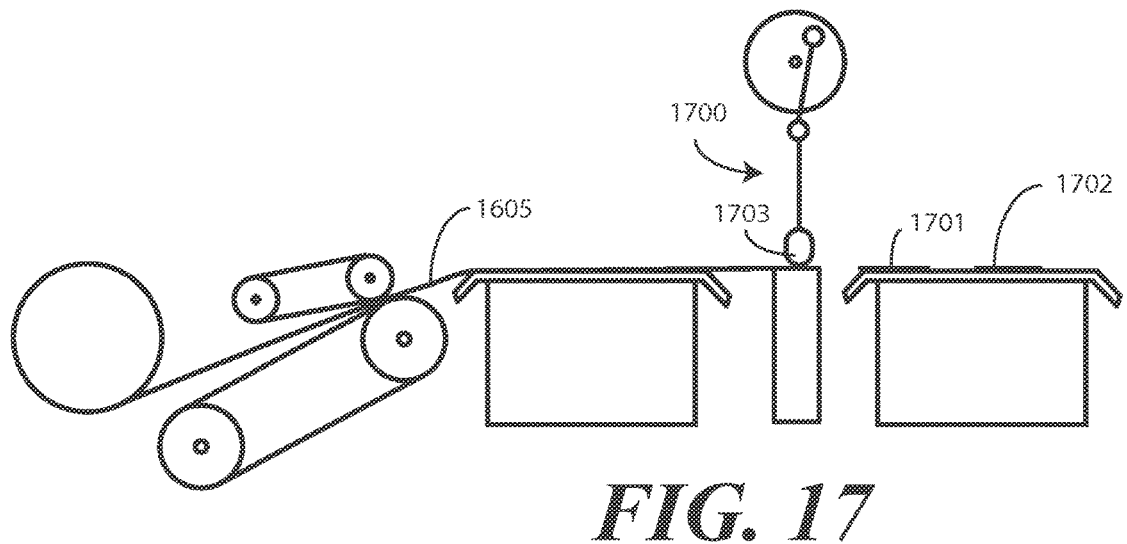
FIG. 17 illustrates one explanatory method of manufacturing reclosable bags in accordance with one or more embodiments of the disclosure.

Turning now to FIGS. 16-17, illustrated therein is a method of making packaging employing one or more zippers configured in accordance with one or more embodiments of the invention. Beginning with FIG. 16, a zipper 100 is fed from a spool 1105. A corresponding web 601,602 is fed from other spools 1601,1602 and is placed against the zipper 100 by placement equipment 1603. The web 601,602 and zipper 100 can each be indexed as desired by a servomotor 1604. The servomotor 1604 can control the acceleration, speed, and deceleration of web 601,602 and zipper 100. Heat sealing bars 603,604 then seal the web 601,602 to the zipper 100 as previously described with reference to FIG. 3 above. The resulting product 1605 can then be wound on another spool 1606.

Turning now to FIG. 17, individual bags 1701,1702 can be manufactured by feeding the product 1605 spooled in FIG. 16 into form and seal machine 1700. The product 1605 is fed to a reciprocating sealing bar 1703 that reciprocates to clamp the product 1605 and simultaneously seal the ends of individual bags 1701,1702. The individual bags 1701,1702 can then be fed into a hopper for packaging.

Figure 18:
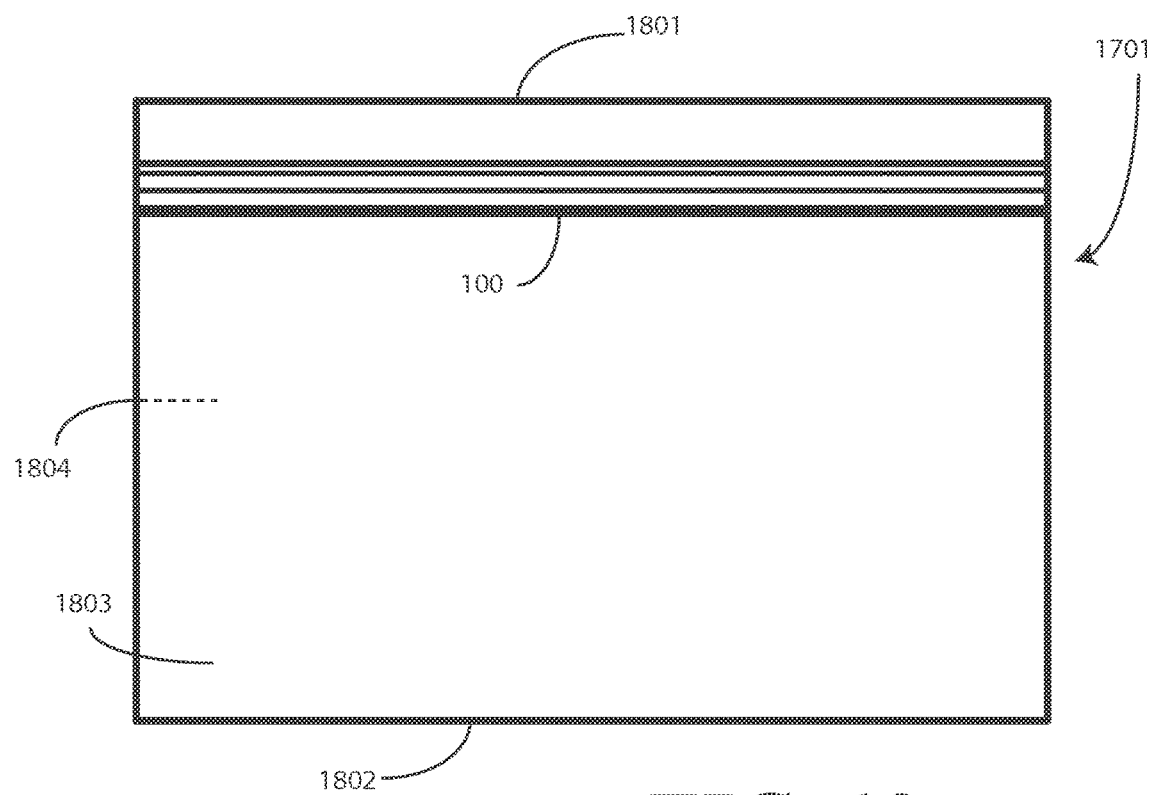
FIG. 18 illustrates one explanatory reclosable bag having a zipper strip configured in accordance with one or more embodiments of the disclosure.

Turning now to FIG. 18, illustrated therein is one example of an individual bag 1701 employing a zipper 1800 configured in accordance with one or more embodiments of the invention. The individual bag 1701 includes a top end 1801 and a bottom end 1802. The individual bag 1701 also includes a front wall 1803, a back wall 1804, and a zipper 1800 that attaches the back wall 1804 to the front wall 1803 with interlocking members.

As shown and descried herein, a zipper, which in one embodiment is a webless zipper, includes a male closure element and a female closure element. Prior at sealing the zipper to a plastic web, the male closure element and female closure element may be attached together. Guide posts that extend from opposite sides of a base member from the male and female interlocking members provide a dual function that includes providing a guide track for a heat sealing bar during the sealing process and providing mechanical stabilization to prevent zipper twisting during spooling processes. Advantageously, the inclusion of the guide bars means the zipper is less likely to rotate during either sealing or spooling processes. In one embodiment, the guide posts are disposed outside the interlocking members for increased stability.

The zipper can be used with reclosable packaging, including reclosable plastic bags. In one embodiment, a reclosable bag includes a male closure element and a female closure element. Each closure element has interlocking members extending from a first side of a base member and guide posts extending from a second side of the guide member. In one embodiment, both the interlocking members and the guide posts extend substantially orthogonally from the base member. The guide posts form sealing regions beyond the centerlines of the interlocking members to facilitate guiding of a heated seal bar to join the sides of a plastic web to the zipper.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. For example while one zipper includes a male closure element and a female closure element, other embodiments use male closure elements exclusively or combinations of alternating male and female closure elements. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A fastener, comprising:
   a male closure element comprising:
      a base member;
      one or more male interlocking members extending distally from a first side of the base member; and
      a plurality of guide posts extending distally from a second side of the base member;
      the plurality of guide posts defining boundaries of a sealing region to which a heat seal bar can thermally adhere a plastic web by passing between the plurality of guide posts, the sealing region defined by a planar portion of the base member that spans between inner surfaces the plurality of guide posts.

2. The fastener of claim 1, the plurality of guide posts comprising two guide posts.

3. The fastener of claim 2, a first guide post defining a first center line oriented substantially orthogonally with a width of the base member, a second guide post defining a second center line oriented substantially orthogonally with the width of the base member, the one or more male interlocking members being disposed along the base member between the first center line and the second center line.

4. The fastener of claim 1, each guide post terminating in a surface convex relative to a width of the base member.

5. The fastener of claim 1, a distance from a first outer surface of a first male interlocking member to a second outer surface of a second male interlocking member being less than another distance between a first guide post inner surface and a second guide post inner surface.

6. The fastener of claim 1, each guide post extending distally from the second side between 0.001 and 0.003 inches.

7. The fastener of claim 1, a distance between a first guide post inner surface and a second guide post inner surface being between 0.086 inches and 0.123 inches.

8. The fastener of claim 1, each male interlocking member terminating at asymmetrical barbs.

9. The fastener of claim 8, the asymmetrical barbs comprising a product side barb and a consumer side barb, the product side barb being longer than the consumer side barb.

10. The fastener of claim 1, the plurality of guide posts defining a guide channel for the heat seal bar.

11. The fastener of claim 1:
    an area disposed along the second side of the base member between two guide posts defining the sealing region to thermally adhere to the plastic web;
    each male interlocking member defining a center line;
    the center line passing substantially orthogonally through the sealing region.

12. The fastener of claim 1, further comprising the plastic web thermally sealed to the fastener.

13. The fastener of claim 1, further comprising a second fastener attached to the fastener by one or more female interlocking members.

14. The fastener of claim 13 further comprising a second plastic web thermally sealed to the second fastener.

15. A fastener, comprising:
    a female closure element comprising:
       a base member;
       one or more female interlocking members extending distally from a first side of the base member; and
       a plurality of guide posts extending distally from a second side of the base member;
       the plurality of guide posts defining boundaries of a sealing region to which a heat seal bar can thermally adhere a plastic web by passing between the plurality of guide posts, the sealing region defined by a planar portion of the base member that spans between inner surfaces the plurality of guide posts.

16. The fastener of claim 15, each female interlocking member having a U-shape and defining a member center line at a base of the U-shape, center lines of at least two female interlocking members disposed between post center lines of any two guide posts.

* * * * *